| United States Patent [19] | [11] Patent Number: 4,654,262 |
| --- | --- |
| Alonso | [45] Date of Patent: Mar. 31, 1987 |

[54] POLYOLEFIN RESIN SURFACE PREPARATION

[75] Inventor: Oscar Alonso, Wrightwood, Calif.

[73] Assignee: ITT Corporation, New York, N.Y.

[21] Appl. No.: 721,749

[22] Filed: Apr. 10, 1985

[51] Int. Cl.$^4$ .................................................. C09J 7/02
[52] U.S. Cl. .................................... 428/345; 428/353; 428/414; 428/416; 428/418; 428/447; 428/448; 428/451; 428/500
[58] Field of Search ............... 428/447, 448, 451, 414, 428/500, 416, 418, 353, 345

[56] References Cited

U.S. PATENT DOCUMENTS

| | | | |
|---|---|---|---|
| 4,052,524 | 10/1977 | Harakas et al. | 428/450 |
| 4,118,540 | 10/1978 | Amort et al. | 428/450 |
| 4,218,513 | 8/1980 | Williams et al. | 428/450 |
| 4,362,783 | 12/1982 | Graham | 428/448 |

*Primary Examiner*—Edith Buffalow
*Attorney, Agent, or Firm*—T. L. Peterson

[57] ABSTRACT

The use of a liquid coupling agent which is adapted to be applied to the surface of a polyolefin resin to modify said surface to render it highly receptive to adhesion. The coupling agent comprises a liquid carrier and an organofunctional silane compound. The coupling agent is used in concert with ultraviolet radiation.

9 Claims, No Drawings

POLYOLEFIN RESIN SURFACE PREPARATION

BACKGROUND OF THE INVENTION

In many industrial operations, it is necessary to bond a polyolefin resin to another material or substrate. The substrate can be another resin or polymeric material, metals such as aluminum, or a variety of other materials. The most common polyolefin resins such as polypropylene or high density polyethylene are fairly difficult to bond because of the physical and chemical characteristics of the resin and the nature of the resin surface.

Heretofore, various procedures have been applied in an effort to improve the bonding characteristics of polyolefin resins. The simplest treatment involves degreasing the resin surface with organic solvents or detergent solutions. Another approach involves the roughening of the resin surface with abrasives or sandpaper. Chemical surface treatments have also been proposed which chemically alter or modify the resin surface. Chemical treatments including the use of etchants or strong oxidizing agents such as the use of chromic acid have also been proposed.

None of the procedures of the prior art have been entirely satisfactory and there has been a long felt need for a better way of preparing the surface of polyolefin resins for bonding.

A number of silicone compounds are known to be useful in improving the physical properties and processability of mineral filed polyolefin composites. However, finely divided mineral fillers of the siliceous type; and other types of fillers such as aluminum trihydrate and calcium carbonate present a large surface area and are more nearly akin in composition to the silicone containing coupling compounds.

The present invention is believed to present a significant advance in the bonding art and comprehends certain liquid coupling agents which can be readily applied to the surface of polyolefin resins. I have found that certain silicone compounds when applied to a polyolefin resin surface in liquid form, dried, and irradiated, such as by ultraviolet light, causes a surface modification of the resin which greatly improved surface adhesion to a wide variety of organic adhesives and glues. While not bound by any theory, it is believed that the coupling agent in conjunction with the ultraviolet irradiation may cause the polyolefin polymer chains within the resin to raise up or in some manner to be displaced, and the side chains to more prominently project, thus providing sites for interlocking with the adhesives. It is also believed that the improved adhesion may be due to enhancement of hydrogen bonding between the adhesive and polyolefin polymer chains. This is believed to be quite surprising in view of the limited bonding area involved and the fact that the silicone coupling agent is not well matched from a chemical standpoint to the organic materials being bonded. In any event, the coupling agents are superior in bonding performance and it is to be expected that they will be widely adopted by those skilled in the art since this invention provides a simple cold bonding at temperatures below that which distorts the polyolefin resin or its surface, or otherwise changes its basic structural and other physical characteristics.

SUMMARY OF THE INVENTION

Briefly, this invention comprises a novel composite comprising a layer of a polyolefin resin and a second superposed layer, the interface between said layers including an organic adhesive, and a coupling agent applied to the surface of said polyolefin resin to modify said surface to render it highly receptive to adhesion, said coupling agent comprising an organofunctional silane compound, said surface having been exposed to ultraviolet irradiation.

This invention also includes the method of bonding a polyolefin resin to another substrate by applying a coupling agent and an adhesive material to the surface of said polyolefin resin, said method also including the ultraviolet irradiation of said surface, and contacting the substrate with the surface of said polyolefin resin, said coupling agent comprising an organofunctional silane compound.

It is an object of this invention to provide a new application for coupling agents providing surprising results.

More particularly, it is an object of my invention to provide a composite including a coupling agent for improving adhesion to polyolefin resins.

In a related aspect, it is another object of this invention to provide a novel method of adhering a substrate to the surface of a polyolefin resin employing an organofunctional silane and ultraviolet irradiation.

These and other objects and advantages of my invention will be apparent to those skilled in the art from the more detailed description which follows.

DESCRIPTION OF THE PREFERRED EMBODIMENTS

The following Examples are illustrative of the invention and are not intended to be limiting in any way.

In the Examples, parts and percentages are by weight unless otherwise indicated.

Examples I and II illustrate preferred coupling agents.

EXAMPLE I

|  | PARTS BY WEIGHT |
|---|---|
| *Y-9777 | 4.00 |
| *Y-9771 | 1.00 |
| Isopropyl alcohol | 100.00 |

*Union Carbide organofunctional silane

EXAMPLE II

|  | PARTS BY WEIGHT |
|---|---|
| S-3076 Silane Sulfonyl azide by Hercules | 6.00 |
| Acetone | 100.00 |
| *Fluorad FC-730 | 0.06 |

*Fluorocarbon Surfactant from 3M Co.

In Examples III through XIV which follow, the polyolefin resin is a thermoplastic elastomeric material sold by Monsanto Company, St. Louis, Mo., under the tradename "Santoprene". The material sold as "Santoprene" is generically defined as a thermoplastic elastomeric composition comprising a blend of about 25 to about 85 parts by weight of crystalline thermoplastic polyolefin resin and about 75 to about 15 parts by weight of vulcanized monoolefin copolymer rubber per 100 parts total weight of said resin and rubber, and extender oil up to 300 parts by weight per 100 parts by weight of rubber, wherein the rubber in said blend is a polymer of monomers comprising ethylene or propylene, and at least one other alpha olefin of the formula $CH_2=CHR'$ in which $R'$ is alkyl of 1-12 carbon atoms and from none to a minor portion of at least one copolymerizable diene in the form of small dispersed particles of about 50 microns or below and is vulcanized to the extent that no more than about three percent of the rubber is extractable in cyclohexane at 23° C. or that the cross-link density determined on the same monoolefin copolymer rubber as in the blend is greater than about $7 \times 10^{-5}$ moles per ml of rubber, the composition being processable in an internal mixer to a product which, upon transferring, with the resin in the molten state, to the rotating rolls of a rubber mill forms an essentially continuous sheet.

More particularly, "Santoprene" contains 25 parts polypropylene to 75 parts of rubber wherein the rubber is EPDM rubber which is the product from the polymerization of ethylene, propylene and a non-conjugated diene such as 1,4-hexadiene, cyclooctadiene or ethylidenenorborene. The preparation and properties of "Santoprene" are more fully described in U.S. Pat. No. 4,130,535 issued Dec. 19, 1978, the disclosure of which is incorporated herein by reference.

The coupling agents are generally used in the following manner. The surface of the polyolefin resin is sprayed or otherwise coated with the liquid coupling agent. The surface is permitted to dry, generally for at least several minutes, and the surface is then irradiated for from 1 to 60 seconds or more with ultraviolet light. It is believed that the ultraviolet enhances the effect of the coupling agent and improves bonding. A preferred irradiation time is about 5 to 10 seconds.

An adhesive is usually applied in liquid form. The adhesive can widely vary in composition. Various commercially known adhesives are directly useful in the practice of this invention including epoxies, epoxy novalaks, cyanoacrylates and silicones. The adhesives are per se known to those skilled in the art. Promptly following the application of the adhesive, the substrate to be bonded to the polyolefin resin is pressed into abutting relationship with the treated and adhesive coated polyolefin resin surface. The adhesive is then allowed to cure, dry and/or set to form the final adhesive bond. Heat may or may not be required, depending upon the adhesive used.

It is to be understood that many variations in this procedure are contemplated. For example, the coupling agent and the adhesive can be pre-mixed and applied together. In some cases the adhesive is a two component system as in epoxies wherein the amine curative is separate from the curable polyglycidyl ether of an aromatic dihydroxy phenol. The curable polyglycidyl ether can be applied and then a pre-mix of coupling agent and amine curing agent can be applied.

The substrates bonded to the polyolefin resin can be any solid material including resins, metals including aluminum and steel, wood and the like. The superior bonding properties make the resulting composite structure useful in numerous applications including connector insulator bonding.

The coupling agents, sometimes also referred to as a "primer", are organofunctional silane compounds such as silane sulfonyl azides having the generic formula:

$$(CH_3O)_3Si-R-SO_2N_3$$

wherein R is a divalent hydrocarbon group such as alkylene or an organic ether group. Other suitable primers include: vinyltriethoxysilane, vinyltrimethoxysilane, vinyl-tris-(2-methoxyethoxysilane), vinyltriacetoxysilane, gammamethacryloxypropyltrimethoxysilane, gamma-methacryloxypropyl-tris-(2-methoxyethoxy)silane, beta-(3,4-epoxycyclohexyl)ethyltrimethoxysilane, gamma-glycidoxypropyltrimethoxysilane, gamma-mercaptopropyltrimethoxysilane, gamma-mercaptopropyltriethoxysilane, gamma-aminopropyltriethoxysilane, aminoalkyl silicone solution, modified aminorganosilane, gamma-aminopropyltrimethoxysilane, N-beta-(aminoethyl)-gamma-aminopropyltrimethoxysilane, modified aminoorganosilane, triaminofunctional silane, and gamma-ureidopropyltriethoxysilane.

In the Examples which follow, the radiation source was a medium pressure mercury lamp with 200 Watts/inch.

This lamp provides ultraviolet irradiation in the range of from 200 to 400 nanometers with a peak at 370. In general, any ultraviolet source can be used. In some cases, the ultraviolet source concurrently emits other radiation such as in the infrared.

EXAMPLE III

A major surface of a layer of Santoprene measuring 2 by 4 inches and having a thickness of ⅛ inch was primed with the following coupling agent of Example I. Ten minutes after priming, the surface had dried and it was then ultraviolet treated for 5 seconds. The Santoprene was bonded to a layer of rigid epoxy resin (Epiall 1908 from Allied Chemical Co.) using a commercial epoxy adhesive. Curing was carried out for 1 hour at 125° C. The results of a pull test were as follows:

| Bond Tensile Strength | Adhesive Failure % |
|---|---|
| 440 psi | 100 |
| 435 psi | 100 |
| 430 psi | 100 |

EXAMPLE IV

Bonding Substrates

Santoprene 101-64
Epiall 1908
Epoxy Adhesive (SM-8081) which is a polyglycidyl ether of bisphenol A. The curing agent is an organic amine—cure 1 hour at 125° C.

| Primer Solution | |
|---|---|
| Y-9777 | 8 parts by weight |
| Y-9771 | 2 parts by weight |
| Methyl Alcohol | 100 |

The bonding conditions in the following Runs 1 to 7 were at room temperature (25° C.) and relative humidity of 85%, unless otherwise indicated.

Bonding Conditions for the various runs were as follows:

1. The Santoprene was bonded to Epiall using commercial epoxy adhesive—no coupling agent.
2. Immerse Santoprene in primer solution, air dried 1 hr. + dried at 200° F. for ½ hr. Exposed to ultraviolet for 8 seconds.
3. Same as 2. No ultraviolet treatment.

4. Rinse in primer solution, air dried for 5 minutes then ultraviolet treated for 8 seconds.
5. Ultraviolet 8 seconds only.
6. Primed and cured 1 hour at 125° C.
7. Primed, dried and 4 second U.V. exposure.

Bond

Test Result—Tensile strength, PSI

| 1 | 2 | 3 | 4 | 5 | 6 | 7 |
|---|---|---|---|---|---|---|
| 140 | 290 | 80 | 260 | 220 | 125 | 340 |
| 165 | 270 | 40 | 250 | 240 | 100 | 360 |
| 140 | 290 | 40 | 240 | 230 | 120 | 340 |

The foregoing illustrates the increased bond strength resulting from the use of the coupling agent in conjunction with ultraviolet irradiation.

EXAMPLE V

In this example, the coupling agent was mixed with the curing agent of a two component commercial epoxy adhesive. The substrates were Santoprene and Epiall 1908. The adhesive and coupling compositions were as shown below. The ultraviolet exposure was for 4 seconds after the adhesive and curing agent containing the primer had been applied to the surface of the Santoprene.

| | 1 | 2 |
|---|---|---|
| Adhesive | | |
| Epon 815 (Polyglycidyl ether of bis-phenol A) | 100 | 50 |
| Methyl ethyl ketone | 300 | 300 |
| Curing Agent and Primer | | |
| Epon V-25 (amine curing agent) | 180 | 90 |
| Isopropyl alcohol | 280 | 280 |
| Y9777 | 12 | 24 |
| Y9771 | 3 | 6 |
| Test results | | |
| Bond Tensile Strength, PSI | | |
| | 400 | 260 |
| | 390 | 320 |
| | 380 | 320 |

EXAMPLE VI

In the following, the epoxy adhesive and amine curing agent were mixed with various coupling agents, and used to bond Santoprene to epoxy resins.

| | 1 | 2 | 3 | 4 | 5 |
|---|---|---|---|---|---|
| Epon Adhesive 815 | 100 | 100 | 100 | 100 | 100 |
| Methyl Ethyl Ketone | 300 | 300 | 500 | 500 | 300 |
| Tridimethyl aminophenol | — | 5 | 5 | 5 | 5 |
| FC-430 Fluorocarbon surfactant | — | — | 0 | 1 | 2 |
| Epon V-25 amine terminated polyamide curative | 180 | 180 | 180 | 180 | 180 |
| Isopropyl alcohol | 280 | 280 | 500 | 500 | 280 |
| Y9777 | 6 | 12 | 24 | 24 | |
| Y9771 | 1.5 | 3 | 6 | 6 | |
| Beta-(3,4-epoxycyclohexyl) ethyltrimethoxysilane | | | | | 2.1 |

Test Results

| 1 Epiall 1980 Bonded to Santoprene | 2 B-390 Polysulphone Resin Bonded to Santoprene | 3 B-390 Polysulphone Resin Bonded to Santoprene | 4 B-390 Polysulphone Resin Bonded to Santoprene | 5 Epiall 1908 Bonded to Santoprene |
|---|---|---|---|---|
| Bond Tensile strength PSI | | | | |
| 310 | 380 | 200 | 380 | 400 |
| 370 | 380 | 340 | 380 | 420 |
| 350 | 360 | 260 | 360 | 380 |

Test Results

EXAMPLE VII

Bonding Substrates

| Santoprene 101-6 Thermoplastic Rubber | R. Temperature 75% R. Humidity 80% |
|---|---|
| Epiall 1908 epoxy substrate | |
| Adhesive Formulation: | |
| Shell 815 Epoxy Adhesive | 100 parts |
| Shell V-25 polyamide curing agent | 180 parts |
| Cure: 1 hour at 125° C. | |
| Primer Solution: | |
| Union Carbide Y9777 | 4 parts |
| Union Carbide Y9771 | 1 part |
| Isopropyl alcohol | 100 parts |

Ultraviolet Radiation Treatment was of 5 seconds duration.

Test conditions

1. No treatment, substrates were bonded as received from the manufacturer with adhesive formulation.
2. Exposed to ultraviolet radiation for 4 seconds.
3. Primed with above primer solution. A thin coat and dried for ½ hour. Exposed to ultraviolet radiation for 4 seconds.

Test Results

| Bond Tensile strength PSI | | |
|---|---|---|
| 1 | 2 | 3 |
| 140 | 220 | 340 |
| 165 | 240 | 360 |
| 140 | 230 | 350 |

EXAMPLE VIII

Bonding Substrates

Santoprene 101-64
Epiall 1908 Epoxy Resin

| Primer Formulation No. 1: | | |
|---|---|---|
| Y9777 | 4 | — |
| Y9771 | 1 | 4 |
| Isopropyl alcohol | 100 | 100 |
| Primer Formulation No. 2: | | |
| Epon 815 | | 100 |
| Methyl Ethyl Ketone | | 500 |
| Tridimethyl aminomethyl phenol | | 5 |
| Fluorocarbon Surfactant | | 1 |
| Epon V-25 Curing Agent | | 180 |
| Isopropyl alcohol | | 500 |
| Y-9777 | | 24 |
| Y-9771 | | 6 |

| Adhesive (Sprayable) | Run No. 1 | Run No. 2 |
|---|---|---|
| Epon 815 | 100 | 100 |

-continued

| Adhesive (Sprayable) | Run No. 1 | Run No. 2 |
|---|---|---|
| Methyl Ethyl Ketone | 300 | 300 |
| Tridimethyl aminomethyl phenol | 5 | 5 |
| FC-430 Fluorocarbon Surfactant | 2 | |
| Epon V-25 | 180 | 180 |
| Isopropyl Alcohol | 280 | 280 |
| Beta-(3,4-epoxycyclohexyl) ethyltrimethoxysilane-(A-186) | 2.1 | |
| Vinyl-tris(2-methoxyethoxysilane) (A-172) | — | 2.1 |

Step 1: spray primer No. 1 on Santoprene and air dry 10 minutes. Pass through ultraviolet light for 5 seconds.

Step 2: spray primer No. 2 on Santoprene air dry 10 minutes. Cure in oven at 125° C. for ½ hour.

Step 3: spray adhesive on Santoprene and Epiall, and air dry 10 minutes. Assemble and bond. Cure 1 hour at 125° C.

Test Results

| Bond Tensile Strength | |
|---|---|
| Run No. 1 | Run No. 2 |
| 460 PSI | 390 |
| 490 PSP | 410 |
| 470 PSI | |

EXAMPLE IX

Primer for bonding Santoprene to Epiall which was dried followed by 8 seconds ultraviolet exposure.

| | 1 | 2 | 3 | 4 |
|---|---|---|---|---|
| Y9777 | 4 | 4 | 4 | 4 |
| Y9771 | 1 | 1 | 1 | 1 |
| Isopropyl alcohol | 100 | 100 | 100 | 100 |
| Benzophenone | 0.5 | 0.75 | 0.375 | — |
| Ketone R-4,4′bis-(N,N′—dimethyl-amino)benzophenone | | | | 0.25 |

Adhesive: The adhesive of Example VIII. Cure 1 hour at 125° C.

| Test result PSI | | | |
|---|---|---|---|
| 440 | 420 | 470 | 420 |
| 410 | 440 | 465 | 410 |
| 450 | 425 | 425 | 400 |

EXAMPLE X

Primer for bonding Santoprene to Epiall

| | 1 | 2 |
|---|---|---|
| Silane Sulfonyl Azide (Hercules S3076) | 6 | 6 |
| Acetone | 100 | 100 |
| FC-730 Fluorocarbon Surfactant | 3 drops | 3 drops |

1-4 passes through ultraviolet oven at 1″/sec, 200 watts/in.

2—no ultraviolet.

Adhesive: The adhesive of Example VIII. Cure 1 hour at 125° C.

Test results

| Bond Tensile Strengths PSI | |
|---|---|
| 450 | 200 |
| 410 | 85 |

EXAMPLE XI

| Bonding substrates | aluminum (etched) to 101-64 Santoprene | Epiall 1908-to 101-64 Santoprene |
|---|---|---|
| Primer: | | |
| Gamma-methacryloxypropyltrimethoxysilane (A-172) | | 4 |
| Benzophenone | | 0.25 |
| Isopropyl alcohol | | 100 |

Adhesive: The adhesive of Example VIII. Cure 1 hr at 125° C.

Bond and tensile strength (PSI) was 400–420

EXAMPLE XII

The following example relates to the bonding of aluminum to Santoprene.

Primer

| Vinyl-tris(2-methoxyethoxysilane)-(A-174) | 4.85 |
|---|---|
| Divinyl peroxide | 0.2 |
| Benzophenone | 0.2 |
| Isopropyl alcohol | 100 |

Ultraviolet exposure=5 seconds.

Adhesive=Example VIII: Cure 1 hour at 250° F.

Bond tensile strength PSI→390–340–350

EXAMPLE XIII

Santoprene 101-64 bonded to Epiall 1908

| Adhesive Epon 815 | 100.0 gms. |
|---|---|
| Methyl Ethyl Ketone | 300.0 gms. |
| Epon | 180.0 gms. |
| Isopropyl alcohol (anhydrous) | 280.0 gms. |
| Gamma-amino-propyltriethoxysilane (A-1100) | 2.1 gms. |
| Primer Y9977 | 4 parts |
| Isopropyl Alcohol | 100 parts |

The primer was sprayed and exposed to ultraviolet for to 5 to 7 seconds.

Adhesive was sprayed and cured 1 hour at 125° C.

Test Results

| Bonds-Tensile Strength (PSI) | | |
|---|---|---|
| | | Average |
| As bonded (1 hr. at 125° C). | 440–420–425 | 428 |
| 250 hours at 125° C. | 490–520–510 | 506 |
| 500 hours at 125° C. | 480–430–480 | 463 |
| 1140 hours at 125° C. | 480–500–490 | 490 |

EXAMPLE XIV

Primer

| | |
|---|---|
| BTDA/3,3,′4,4′-benzophenonetetracarboxylic dianhydride | 1 |
| Vinyl-tris(2-methoxyethoxysilane)-(A-172) | 4 |
| Acetone | 100 |

Ultraviolet cure 5 to 7 seconds.
Adhesive of Example XIII, cure 1 hour at 125° C.
Substrates—Santoprene 101-64 and Epiall 1908
Bond tensile strength PSI 400–440–425

It is to be understood that this invention is not limited to Santoprene. All other normally solid polyolefin resins are included such as polyethylene, high density polyethylene, ordinary polypropylene and the like.

Having fully described the invention it is intended that it be limited only by the lawful scope of the appended claims.

I claim:

1. A novel composite structure comprising a layer of a polyolefin resin and a second superposed layer, the interface between said layers including an organic adhesive, and a coupling agent applied to the surface of said polyolefin resin to modify said surface to render it highly receptive to adhesion, said coupling agent comprising an organofunctional silane compound, said surface having been exposed to ultraviolet irradiation.

2. The composite structure of claim 1 wherein the polyolefin is high density polyethylene.

3. The composite structure of claim 1 wherein the polyolefin is polyethylene.

4. The composite structure of claim 1 wherein the polyolefin is polypropylene.

5. The composite structure of claim 1 wherein the organofunctional silane is selected from the group consisting of silane sulfonyl azides, vinyltriethoxysilane, vinyltrimethoxysilane, vinyl-tris(2-methoxyethoxysilane), vinyltriacetoxysilane, gamma-methacryloxypropyltrimethoxysilane, gamma-methacryloxypropyl-tris-(2-methoxyethoxy)silane, beta-(3,4-epoxycyclohexyl)ethyltrimethoxysilane, gamma-glycidoxypropyltrimethoxysilane, gamma-mercaptopropyltrimethoxysilane, gamma-mercaptopropyltriethoxysilane, gamma-aminopropyltriethoxysilane, aminoalkyl silicone solution, modified aminorganosilane, gamma-aminopropyltrimethoxysilane, N-beta-(aminoethyl)-gamma-aminopropyltrimethoxysilane, modified aminoorganosilane, triaminofunctional silane, and gamma-ureidopropyltriethoxysilane.

6. The composite structure of claim 1 wherein the adhesive is an epoxy resin.

7. The novel composite of claim 1 wherein said ultraviolet irradiation is carried out for from 1 to about 60 seconds.

8. The composite structure of claim 1 wherein the polyolefin comprises a blend of about 25 to about 85 parts by weight of crystalline thermoplastic polyolefin resin and about 75 to about 15 parts by weight of vulcanized monolefin copolymer rubber per 100 parts total weight of said resin and rubber.

9. The composite structure of claim 8 wherein the polyolefin is crystalline thermoplastic polypropylene having a vulcanized monoolefin copolymer rubber dispersed therein which rubber is the product from the polymerization of ethylene, propylene and a non-conjugated diene.

* * * * *